United States Patent
Gouerec et al.

(10) Patent No.: US 10,814,665 B2
(45) Date of Patent: Oct. 27, 2020

(54) WRITING OR COLORING PENCIL

(71) Applicant: CONTE, Boulogne-sur-Mer (FR)

(72) Inventors: Julien Gouerec, Boulogne-sur-Mer (FR); Philippe Lefebvre, Wimereux (FR)

(73) Assignee: CONTE, Boulogne-sur-Mer (FR)

( * ) Notice: Subject to any disclaimer, the term of this patent is extended or adjusted under 35 U.S.C. 154(b) by 46 days.

(21) Appl. No.: 16/311,034

(22) PCT Filed: Jun. 20, 2017

(86) PCT No.: PCT/FR2017/051614
§ 371 (c)(1),
(2) Date: Dec. 18, 2018

(87) PCT Pub. No.: WO2017/220914
PCT Pub. Date: Dec. 28, 2017

(65) Prior Publication Data
US 2019/0322120 A1    Oct. 24, 2019

(30) Foreign Application Priority Data

Jun. 21, 2016 (FR) .................... 16 55767

(51) Int. Cl.
  *B43K 19/16* (2006.01)
  *B43K 19/02* (2006.01)
  *B43K 19/14* (2006.01)
  *C09D 13/00* (2006.01)

(52) U.S. Cl.
CPC ............. *B43K 19/16* (2013.01); *B43K 19/02* (2013.01); *B43K 19/14* (2013.01); *C09D 13/00* (2013.01)

(58) Field of Classification Search
CPC ........ B43K 19/16; B43K 19/02; B43K 19/14; B43K 19/00; B43K 19/04; B43K 19/06; B43K 19/08; B43K 19/145; C09D 13/00
See application file for complete search history.

(56) References Cited

U.S. PATENT DOCUMENTS

| | | | |
|---|---|---|---|
| 5,244,297 A | 9/1993 | Bachelet et al. | |
| 6,572,295 B1 * | 6/2003 | Chochoy ............... | B43K 19/16 156/244.12 |
| 8,747,003 B2 | 6/2014 | Thies et al. | |
| 10,316,208 B2 * | 6/2019 | Gouerec ............... | B43K 19/02 |
| 2006/0194049 A1 | 8/2006 | Thies et al. | |

FOREIGN PATENT DOCUMENTS

| | | |
|---|---|---|
| EP | 2845747 | 3/2015 |
| JP | 52-70618 | 6/1977 |
| WO | 0143987 | 6/2001 |
| WO | 2010006744 | 1/2010 |

OTHER PUBLICATIONS

International Search Report dated Oct. 10, 2017 in corresponding International PCT Patent Application PCT/FR2017/051614, 2 pages.

* cited by examiner

*Primary Examiner* — David J Walczak
(74) *Attorney, Agent, or Firm* — Ohlandt, Greeley, Ruggiero & Perle, L.L.P.

(57) ABSTRACT

A writing or coloring pencil has three layers obtained by co-extrusion, including an unexpanded polymer-based lead, an unexpanded intermediate protective layer surrounding the lead and comprising an ethylene (C1-C4 alkyl) acrylate copolymer, alone or as a blend with a styrene polymer, and an expanded styrene polymer-based synthetic wood material surrounding the intermediate protective layer.

21 Claims, 1 Drawing Sheet

WRITING OR COLORING PENCIL

CROSS-REFERENCE TO RELATED APPLICATIONS

The present application is a National Phase Entry of International Application No. PCT/FR2017/051614, filed Jun. 20, 2017 that claims priority to French Application No. 1655767 filed on Jun. 21, 2016, the entire contents of each of which is incorporated by reference herein.

BACKGROUND

1. Field of the Disclosure

The present invention relates to writing or coloring pencils obtained by co-extrusion, comprising a polymer-based lead and a synthetic wood material.

2. Description of Related Art

Writing or coloring pencils of this type are known to the person skilled in the art.

In particular, Application WO 01/43987 indicates that such pencils must include an intermediate protective layer made of a thermoplastic material that needs to have a solidification point that is lower than the solidification point of the thermoplastic material of the lead in order to avoid problems with splitting of the lead as it cools.

However, the only sheath materials that are mentioned are a styrene polymer as the thermoplastic material blended with a thermoplastic elastomer, for example of the SBS (styrene butadiene styrene) type, or an ethyl vinyl acetate (EVA) copolymer in proportions of 95/5 to 70/30, with a styrene/EVA blend of 80/20 or 83/15 or, with SBS, a styrene polymer/thermoplastic elastomer blend of 88/10 being given as an example.

It also mentions the possible use in the protective sheath of a thermoplastic material based on an elastomeric thermoplastic.

SUMMARY

Surprisingly, the inventors have found that when EVA is replaced by an ethylene ($C_1$-$C_4$ alkyl) acrylate copolymer, in particular the copolymer ethylene butyl acrylate (EBA), the sheath exhibits better adhesion with the lead, which means that in certain circumstances, in particular for fine leads, problems with falling out leads can be avoided and in all cases it is possible to avoid the risks of loss of cohesion between the lead and the protective layer during the sharpening operation, which is not desirable. Furthermore, this good adhesion exists irrespective of the polymer of the lead (polyolefin or styrene polymer).

None of the prior art that is currently known describes such a solution to the problem of adhesion between the polymer-based lead and the protective sheath.

Thus, Application WO 2010/006744 also describes the necessary presence of an adhesion layer between the lead and the synthetic wood material for pencils in which the polymer of the lead is incompatible with the polymer of the synthetic wood material. However, the material indicated for that layer is preferably a styrene/butadiene copolymer and/or a styrene/ethene-butadiene/styrene block copolymer.

Application US 2006/0194049 also describes the presence of a protective envelope for the lead that has a higher bending strength than that of the lead and that thus stabilizes the lead in order to prevent it from breaking. However, it indicates that the composition of the envelope is similar to that of the lead.

U.S. Pat. No. 5,244,297 also discloses a writing or coloring pencil comprising three layers: an unexpanded polymer-based lead, an unexpanded intermediate protective layer surrounding the lead, and an expanded synthetic wood material surrounding the intermediate protective layer.

In that disclosure it is indicated that advantageously, all three layers are based on the same material, such as a polystyrene methacrylate copolymer, which means that very good adhesion can be obtained.

However, the problems with adhesion that are encountered when the lead, the intermediate layer, and the synthetic wood material are based on different polymers are not addressed.

The problem is that polystyrene methacrylate copolymer is incompatible with polyolefins and that an intermediate protective layer based on polystyrene methacrylate copolymer cannot be used if the lead is based on a polyolefin.

Patent application JPS 5 270 618 indicates the possible presence of an adhesive layer between the lead and the sheath; that adhesive layer could comprise various possible types of adhesive, but it is stressed that the preferred adhesive is EVA copolymer, which is therefore used in its exemplary embodiments.

Furthermore, the adhesive layer in that document is not extruded.

Thus, the present invention provides a writing or coloring pencil comprising the following three layers obtained by co-extrusion:
  an unexpanded polymer-based lead;
  an unexpanded intermediate protective layer surrounding the lead and comprising an ethylene ($C_1$-$C_4$ alkyl) acrylate copolymer, alone or as a blend with a styrene polymer; and
  an expanded styrene polymer-based synthetic wood material surrounding the intermediate protective layer.

The pencil of the present invention thus includes a polymer-based lead.

Within the meaning of the present invention, the term "polymer-based lead" means any lead for a writing or coloring pencil comprising at least one polymer.

In an advantageous embodiment, the polymer of the lead is selected from styrene polymers and polyolefins, in particular polyolefins.

When the lead comprises a polyolefin, it is termed a "polyolefin-based lead" in the context of the present invention.

Thus, within the meaning of the present invention, the term "polyolefin-based lead" should be understood to mean any lead for a writing or coloring pencil comprising at least one polyolefin. In a polyolefin-based lead of the invention, the polyolefin is advantageously the main polymer of the lead. More advantageously, the polyolefin-based lead does not include other polymers. Advantageously, the polyolefin may be polyethylene or polypropylene, in particular polypropylene, more particularly homopolymeric polypropylene.

When the lead comprises a styrene polymer, it is termed a "styrene-polymer-based lead" in the context of the present invention.

Thus, within the meaning of the present invention, the term "styrene-polymer-based lead" should be understood to mean any writing or coloring pencil lead comprising at least one styrene polymer. In a styrene-polymer-based lead of the invention, the styrene polymer is advantageously the main polymer of the lead. More advantageously, the styrene-polymer-based lead does not comprise other polymers. Advantageously, the styrene polymer is polystyrene (PS), styrene acrylonitrile (SAN), or acrylonitrile butadiene styrene (ABS), in particular acrylonitrile butadiene styrene (ABS).

Thus, advantageously, the polymer for the lead is selected from acrylonitrile butadiene styrene and polypropylene.

Advantageously, the polymer content, in particular of styrene polymer or polyolefin, in the lead is in the range 15% to 45% by weight with respect to the total weight of the composition of the lead, advantageously in the range 25% to 40% by weight with respect to the total weight of the composition of the lead.

The lead of the present invention may be a lead for a graphite pencil or a lead for a colour pencil.

When the polymer-based lead of the present invention is a lead for a graphite pencil, it may comprise a polymer content, in particular of styrene polymer or polyolefin, in the range 15% to 40% by weight, advantageously in the range 20% to 35% by weight, with respect to the total composition of the lead.

When the lead of the present invention is a lead for a colour pencil, it may comprise a polymer content, in particular of styrene polymer or polyolefin, in the range 25% to 45% by weight, advantageously in the range 30% to 40% by weight, with respect to the total weight of the composition of the lead.

The lead of the present invention may also comprise mineral fillers, pigments, plasticizers, and/or additives. Advantageously, the polyolefin-based lead does not include a plasticizer.

Advantageously, the pigment content in the lead is in the range 5% to 30% by weight, the mineral filler content is in the range 5% to 75% by weight and/or the quantity of additives and/or plasticizers is in the range 0 to 50% by weight, with respect to the total weight of the composition of the lead.

When the lead of the present invention is a graphite pencil lead, it may comprise graphite and optionally a colorless mineral filler. In particular, it comprises graphite and a colorless mineral filler. Advantageously, the colorless mineral filler is selected from a clay, talc, boron nitride, silica, calcium carbonate, mica, steatite powder, and mixtures thereof. Particularly advantageously, it is a flake filler, more particularly selected from a clay, boron nitride, mica, and/or talc, for example a clay, in particular selected from montmorillonite, bentonite, and kaolin. Advantageously, it is kaolin.

Advantageously, the graphite content in the graphite pencil lead of the present invention is in the range 40% to 60%, in particular in the range 44% to 50%, by weight with respect to the total weight of the composition of the lead.

Advantageously, the colorless mineral filler content of the graphite pencil lead of the present invention is in the range 5% to 15%, in particular in the range 6% to 10%, by weight with respect to the total weight of the composition of the lead.

It may also comprise carbon black as a pigment.

Advantageously, the quantity of carbon black in the graphite pencil lead of the present invention is in the range 5% to 20%, in particular in the range 5% to 15%, by weight with respect to the total weight of the composition of the lead.

When the lead of the present invention is a colour pencil lead, the mineral filler is a colorless mineral filler, in particular as described above.

Advantageously, the quantity of colorless mineral filler in the colour pencil lead of the present invention is in the range 5% to 50%, in particular in the range 10% to 40%, by weight with respect to the total weight of the composition of the lead.

The additives that may be used in the lead of the present invention may be selected from glide agents, processing agents, coupling agents, dispersing agents, lubricants, and other additives that are well known to the person skilled in the art. As an example, a stearate may be used (zinc, calcium, magnesium, sodium stearate and mixtures thereof, in particular calcium stearate), waxes, paraffins, fatty acids, amides such as a stearamide, in particular ethylene bis-stearamide, glycerol and its derivatives such as glycerol dibehenate, glycerol behenate, glycerol stearate and/or polyglycerol diisostearate, siloxane grafted onto polypropylene and mixtures thereof, in particular calcium stearate, magnesium stearate, zinc stearate, amides or a mixture thereof.

The lead of the present invention is unexpanded. This means that no expansion agent is used in its fabrication process. Furthermore, the polymer used is not expanded.

In a particular embodiment of the present invention, the lead has a diameter in the range 2 millimeters (mm) to 3.8 mm.

Particularly in the case of fine leads, the lead has a diameter in the range 2 mm to 2.3 mm.

Under such circumstances, and advantageously, with intermediate protective layers that are thick, the ratio of the thickness of the intermediate protective layer divided by the radius of the lead is in the range 0.05 to 0.16, advantageously in the range 0.06 to 0.15, more advantageously in the range 0.07 to 0.15

With thick leads, the lead has a diameter in the range 3 mm to 3.8 mm and with very thick leads, the lead has a diameter in the range 3.4 mm to 3.8 mm. Under such circumstances, and advantageously with intermediate protective layers that are thick, the ratio of the thickness of the intermediate protective layer divided by the radius of the lead is in the range 0.07 to 0.16, advantageously in the range 0.08 to 0.15, more advantageously in the range 0.09 to 0.15.

The lead of the present invention must therefore include fillers and pigments for writing that can be transferred easily onto the writing medium or coloring pigments that can produce good coverage.

Advantageously, the lead of the present invention may have a section that is hexagonal, round or triangular, advantageously round or hexagonal.

The pencil of the present invention includes an unexpanded intermediate protective layer surrounding the lead, advantageously concentrically, and comprising an ethylene ($C_1$-$C_4$ alkyl) acrylate copolymer, alone or as a blend with a styrene polymer. This intermediate layer has two roles:

Firstly, it must ensure adhesion between the polymer-based lead, in particular polyolefin-based, and the styrene polymer-based synthetic wood material.

It should also be able to compensate for the shrinkage of the lead during the cooling step after the co-extrusion step, so as to avoid problems with splitting of the lead.

This intermediate protective layer then completely separates the lead from the synthetic wood material.

In an advantageous embodiment, the thickness of the intermediate protective layer is in the range 0.05 mm to 0.31 mm, more advantageously in the range 0.07 mm to 0.27 mm, in particular in the range 0.08 mm to 0.17 mm, still more advantageously in the range 0.07 mm to 0.09 mm.

Particularly with leads for a colour pencil, the thickness of the intermediate protective layer is advantageously in the range 0.05 mm to 0.10 mm, advantageously in the range 0.06 mm to 0.09 mm, in particular in the range 0.07 mm to 0.09 mm.

Advantageously under such circumstances, the intermediate protective layer is of the same color as the wood material or as the lead, in particular as the wood material, and it is therefore invisible.

With graphite pencil leads, the thickness of the intermediate protective layer is advantageously in the range 0.11 mm to 0.31 mm, more advantageously in the range 0.13 mm to 0.27 mm, in particular in the range 0.14 mm to 0.17 mm.

Advantageously under such circumstances the intermediate protective layer is of a color that differs from the color of the wood material or of the lead and it is therefore visible.

The intermediate protective layer may also be thin, and it may then have a thickness in the range 0.05 mm to 0.10 mm, advantageously in the range 0.06 mm to 0.09 mm, in particular in the range 0.07 mm to 0.09 mm.

Advantageously under such circumstances, the intermediate protective layer is of the same color as the wood material or as the lead, in particular as the wood material, and it is therefore invisible.

The protective intermediate layer of the present invention comprises an ethylene ($C_1$-$C_4$ alkyl) acrylate copolymer alone or as a blend with a styrene polymer; advantageously, it is constituted by an ethylene ($C_1$-$C_4$ alkyl) acrylate copolymer, alone or as a blend with a styrene polymer, in particular as a blend with a styrene polymer.

Within the meaning of the present invention, the expression "$C_1$-$C_4$ alkyl" means any linear or branched alkyl group containing 1 to 4 carbon atoms such as, for example, the methyl, ethyl, propyl, n-propyl, isopropyl, butyl, n-butyl, tert-butyl, or isobutyl group. Advantageously, it is a methyl, ethyl, butyl, n-butyl, isobutyl, or tert-butyl group, in particular a butyl, n-butyl, isobutyl, or tert-butyl group, more particularly a n-butyl group.

Advantageously, the ethylene ($C_1$-$C_4$ alkyl) acrylate copolymer is selected from ethylene methyl acrylate copolymer, ethylene ethyl acrylate copolymer, and ethylene butyl acrylate copolymer; in particular, it is ethylene butyl acrylate copolymer, such as ethylene n-butyl acrylate copolymer.

Advantageously, the styrene polymer is styrene acrylonitrile, polystyrene, or acrylonitrile butadiene styrene (ABS), in particular polystyrene or acrylonitrile butadiene styrene, more particularly polystyrene. In particular, the polystyrene is an atactic polystyrene. It may be a crystalline polystyrene.

Thus, advantageously, the unexpanded intermediate protective layer surrounding the lead comprises ethylene butyl acrylate copolymer as a blend with polystyrene or acrylonitrile butadiene styrene (ABS).

In the context of the present invention, the styrene polymer is intended to produce adhesion between the intermediate protective layer and the synthetic wood material, as well as to produce the good mechanical behavior of this layer (resistance to sharpening without fraying), especially with sheaths that are very thick (such as a thickness in the range 0.11 mm to 0.31 mm, more advantageously in the range 0.13 mm to 0.27 mm, in particular in the range 0.14 mm to 0.17 mm), but it is also advantageous with sheaths that are very thin (such as a thickness in the range 0.05 mm to 0.10 mm, advantageously in the range 0.06 mm to 0.09 mm, in particular in the range 0.07 mm to 0.09 mm). When the lead is based on styrene polymer, it may also be intended to compatibilize the sheath with the lead.

Advantageously, the ethylene ($C_1$-$C_4$ alkyl) acrylate copolymer comprises in the range 10% to 40% by weight of ($C_1$-$C_4$ alkyl) acrylate co-monomer, in particular in the range 15% to 30% by weight, with respect to the total weight of the ethylene ($C_1$-$C_4$ alkyl) acrylate copolymer.

Thus, advantageously, when the ethylene ($C_1$-$C_4$ alkyl) acrylate copolymer is ethylene butyl acrylate copolymer, it comprises in the range 10% to 40% by weight of butyl acrylate co-monomer, in particular in the range 15% to 30% by weight, with respect to the total weight of the ethylene butyl acrylate copolymer.

In the context of the present invention, the ethylene ($C_1$-$C_4$ alkyl) acrylate copolymer, in particular ethylene butyl acrylate copolymer, is intended to provide adhesion between the protective intermediate layer and the lead and to reduce the solidification point (also routinely termed the softening point) of the intermediate protective sheath, in particular of the styrene polymer when it is present, such as polystyrene, styrene acrylonitrile, or acrylonitrile butadiene styrene (ABS), in a manner such that the solidification point of the sheath, in particular of the blend of styrene polymer and ethylene ($C_1$-$C_4$ alkyl) acrylate copolymer, is lower than the solidification point of the polymer (advantageously ABS or polypropylene) of the lead.

In an advantageous embodiment, the ethylene ($C_1$-$C_4$ alkyl) acrylate copolymer content of the sheath is in the range 20% to 100% by weight, advantageously in the range 25% to 60% by weight, more advantageously in the range 30% to 55% by weight, with respect to the total weight of the composition of the sheath (100% corresponds to a protective intermediate layer constituted by ethylene ($C_1$-$C_4$ alkyl) acrylate copolymer).

In particular, when the sheath comprises a mixture of ethylene ($C_1$-$C_4$ alkyl) acrylate copolymer with a styrene polymer, the quantity of the protective intermediate layer blend is in the range 85% to 100% by weight with respect to the total weight of the protective intermediate layer (100% corresponds to a protective intermediate layer constituted by a blend of ethylene ($C_1$-$C_4$ alkyl) acrylate copolymer with a styrene polymer), advantageously 90% to 97% by weight with respect to the total weight of the protective intermediate layer, more advantageously in the range 93% to 96% by weight with respect to the total weight of the protective intermediate layer.

The protective intermediate layer may furthermore comprise pigments such as a masterbatch, in particular based on polystyrene, which in particular acts to supply color to this layer.

Advantageously, the quantity of pigment of this layer is in the range 3% to 10% by weight with respect to the total weight of the protective intermediate layer, more advantageously in the range 4% to 7% by weight with respect to the total weight of the protective intermediate layer.

In a particular embodiment, the color of the protective intermediate layer differs from that of the lead and of the synthetic wood material.

This enables this layer to be visible to the consumer, which may be of pleasing appearance and give scope for the various colors to be manipulated in order to make the pencil highly distinctive and attractive.

In another advantageous embodiment, this layer has the same color as that of the lead, which means that the consumer can be given the impression that the pencil has a thicker lead, or it can conceal the presence of this sheath.

In yet another advantageous embodiment, the color of this layer is the same as that of the synthetic wood material, which means that the presence of this sheath can be concealed, and thus it can be made invisible.

Advantageously, the quantity of styrene polymer, when present, in particular the quantity of polystyrene or of acrylonitrile butadiene styrene (ABS), more particularly of polystyrene, in the protective intermediate layer is in the range 25% to 90% by weight, more advantageously in the range 30% to 75% by weight, yet more advantageously in the range 35% to 70% by weight, with respect to the total weight of the protective intermediate layer.

Furthermore, the protective intermediate layer is unexpanded. This means that no expansion agent is used during its fabrication process. Furthermore, the styrene polymer used is not expanded.

In addition, the protective intermediate layer advantageously does not have bending strength greater than that of the lead.

Furthermore, the protective intermediate layer advantageously does not have the same function as the lead, i.e. it is not intended for writing or coloring. The pigments that are optionally present in this layer are thus not capable of being transferred easily onto the writing medium and thus do not have good coverage properties.

In contrast, it advantageously has a melting temperature that is equal to or lower than the melting temperatures both of the lead and of the synthetic wood material.

In an advantageous embodiment, the thickness of the protective intermediate layer is in the range 0.11 mm to 0.31 mm, advantageously in the range 0.13 mm to 0.27 mm, in particular in the range 0.14 mm to 0.17 mm.

Under such circumstances, and advantageously, the ethylene ($C_1$-$C_4$ alkyl) acrylate copolymer content of the sheath is in the range 25% to 50% by weight, advantageously in the range 30% to 40% by weight, with respect to the total weight of the composition of the sheath.

Advantageously, the protective intermediate layer is then of color that differs from the color of the wood material or of the lead, and it is therefore visible.

This applies particularly with protective intermediate layers for a graphite pencil of the invention.

In another advantageous embodiment, the thickness of the protective intermediate layer is in the range 0.05 mm to 0.10 mm, advantageously in the range 0.06 mm to 0.09 mm, in particular in the range 0.07 mm to 0.09 mm.

Under such circumstances, and advantageously, the ethylene ($C_1$-$C_4$ alkyl) acrylate copolymer content of the sheath is in the range 25% to 100% by weight, advantageously in the range 35% to 60% by weight, more advantageously in the range 45% to 55% by weight, with respect to the total weight of the composition of the sheath.

Particularly advantageously, the intermediate protective layer is then of the same color as the wood material or as the lead, in particular as the wood material, and it is therefore invisible.

This applies particularly for the protective intermediate layers for a colour pencil of the invention.

In another advantageous embodiment, the thickness of the protective intermediate layer is in the range 0.05 mm to 0.10 mm, advantageously in the range 0.06 mm to 0.09 mm, in particular in the range 0.07 mm to 0.09 mm, and the ethylene ($C_1$-$C_4$ alkyl) acrylate copolymer content of the sheath is in the range 25% to 50% by weight, advantageously in the range 30% to 40% by weight, with respect to the total weight of the composition of the sheath. Particularly advantageously the intermediate protective layer is then of the same color as the wood material or as the lead, in particular as the wood material, and it is therefore invisible.

This applies particularly with protective intermediate layers for a graphite pencil of the invention.

The pencil of the present invention furthermore comprises an expanded styrene polymer-based synthetic wood material surrounding the protective intermediate layer, advantageously concentrically.

Within the meaning of the present invention, the term "synthetic wood material" means any polymer-based synthetic material for a writing or coloring pencil and of density and sharpenability that resemble the density and sharpenability of wood.

Within the meaning of the present invention, the term "styrene-polymer-based synthetic wood material" should be understood to mean any synthetic wood material as defined above comprising at least one styrene polymer, i.e. a polymer or copolymer based on styrene. Advantageously, the styrene polymer is the main polymer of the synthetic wood material. More advantageously, the synthetic wood material does not comprise other polymers. Advantageously, the styrene polymer may be polystyrene, ABS (acrylonitrile butadiene styrene), or a polystyrene methacrylate copolymer; in particular, it is polystyrene, more particularly atactic polystyrene.

Advantageously, the quantity of styrene polymer, in particular of polystyrene, in the synthetic wood material is in the range 60% to 100% by weight, advantageously in the range 70% to 98% by weight, in particular in the range 80% to 95% by weight, with respect to the total weight of the synthetic wood material.

In addition to the styrene polymer, the synthetic wood material may contain pigments (several % by weight, in particular in the range 0 to 5% by weight, advantageously in the range 0.5% to 2% by weight, with respect to the total weight of the composition of the synthetic wood material), such as a masterbatch and/or red iron oxide, in particular in order to endow the synthetic wood material with a color close to that of wood, plasticizers, sawdust, mineral fillers (several % by weight, advantageously in the range 0 to 10% by weight, in particular in the range 2% to 6% by weight, more particularly in the range 3% to 5% by weight, with respect to the total weight of the composition of the synthetic wood material), in particular colorless fillers such as clays, for example kaolin, and/or other additives such as calcium stearate and/or a stearamide (several % by weight, advantageously in the range 0 to 5% by weight, in particular in the range 1% to 3% by weight, with respect to the total weight of the composition of the synthetic wood material).

The synthetic wood material is expanded in a manner such as to obtain a density close to that of wood. In order to obtain an expanded synthetic wood material, an expanding agent such as azodicarbonamide, for example, is advantageously added to the composition of the synthetic wood material prior to extrusion.

Since the three layers may be obtained by co-extrusion, the pencil of the present invention may be produced using a continuous process. In particular, this process is as described in the application WO 01/43987.

The entire pencil of the present invention must have good sharpening properties and density close to that of a traditional wood pencil.

In a particular embodiment of the present invention, the writing or coloring pencil of the invention includes an additional decorative layer, advantageously a lacquer, surrounding the synthetic wood material, in particular concentrically.

Advantageously, the decorative layer is produced from a material that is compatible with that of the synthetic wood material.

Advantageously, the writing or coloring pencil of the present invention may have a section that is hexagonal, round, or triangular, advantageously round or hexagonal.

Advantageously, it may include means for erasing, such as an eraser, at the unsharpened end of the pencil.

The invention can be better understood from the description of the figures and the examples below.

DETAILED DESCRIPTION OF THE DISCLOSURE

Figure 1:
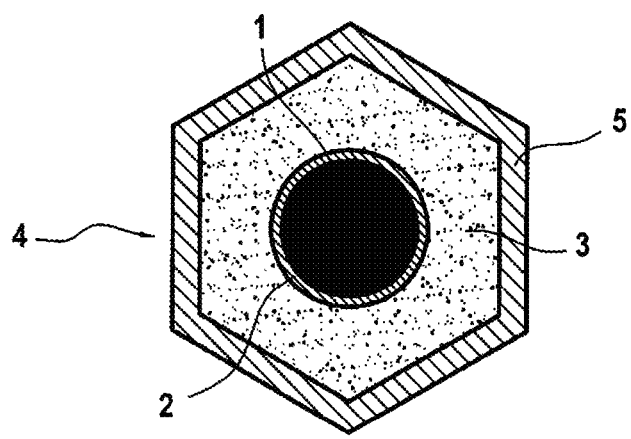
FIG. 1 shows a cross section of an example of a graphite pencil of the invention with a section that is hexagonal.
Figure 2:
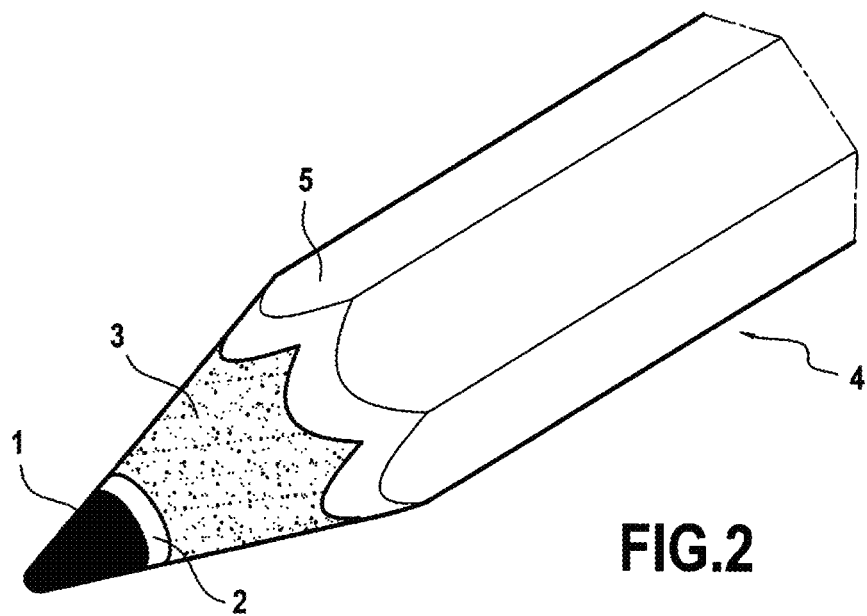
FIG. 2 is a perspective view of the example of a graphite pencil of the invention with a section that is hexagonal.

The example of the graphite pencil 4 of the invention with a section that is hexagonal and shown in FIGS. 1 and 2 therefore comprises four layers, the lead (1) with a circular section, the protective intermediate layer (2) with a circular section that concentrically surrounds the lead (1), the expanded synthetic wood material (3) with a hexagonal section that concentrically surrounds the protective intermediate layer, and a decorative layer (5) with a hexagonal section that concentrically surrounds the synthetic wood material.

The protective intermediate layer 2 is of a color that is different from that of the lead and the synthetic wood material and it is therefore visible both on the cross section of the pencil (FIG. 1), but also on the sharpened portion of the pencil (FIG. 2).

Example 1: Polyolefin-Based Lead

A graphite pencil of the invention with a section that is hexagonal as illustrated in FIGS. 1 and 2 or with a section that is triangular was produced by co-extrusion.

The compositions of the various layers were as follows:
lead: polypropylene (PP, 25-35%), graphite (40-50%)+additives/pigments;
protective intermediate layer: polystyrene or ABS (50-70%), ethylene butyl acrylate (EBA) (30-50%)+pigments.
synthetic wood material (3): polystyrene (90-95%)+additives/pigments/colorless mineral filler.

The thickness of the protective intermediate layer was 0.15 mm and that of the lead was 2.3 mm.

A visual inspection was carried out after the pencil sharpening step.

Good adhesion and very good sharpenability were observed.

When this pencil was compared with a pencil obtained under the same conditions but with a sheath comprising: polystyrene or ABS (60-80%), EVA (20-40%)+pigments, better adhesion of the sheath with the lead was observed with the pencil of the present invention.

Example 2: Polyolefin-Based Lead

A graphite pencil of the invention with a section that is hexagonal as illustrated in FIGS. 1 and 2 or with a section that is triangular was produced by co-extrusion.

The compositions of the various layers were as follows:
lead: polypropylene (PP, 25-35%), graphite (40-50%)+additives/pigments;
protective intermediate layer: polystyrene (60%), ethylene butyl acrylate (EBA) (35%)+masterbatch (5%);
synthetic wood material (3): polystyrene (90-95%)+additives/pigments/colorless mineral filler.

The thickness of the protective intermediate layer was in the range 0.07 to 0.09 and that of the lead was 2.3 mm.

A visual inspection was carried out after the pencil sharpening step.

Good adhesion and very good sharpenability were observed.

When this pencil was compared with a pencil obtained under the same conditions but with a sheath comprising: polystyrene (60%), EVA (35%)+masterbatch (5%), better adhesion of the sheath with the lead was observed with the pencil of the present invention, even though the sheath was very thin.

Example 3: Styrene-Polymer-Based Lead

A colour pencil of the invention with a section that is hexagonal as illustrated in FIGS. 1 and 2 or with a section that is triangular was produced by co-extrusion.

The compositions of the various layers were as follows:
lead: ABS (35-40%), kaolin (10-15%), calcium stearate (25-30%)+additives/plasticizer/pigments (20-30%);
protective intermediate layer: ABS (40-60%), ethylene butyl acrylate (EBA) (40-60%)+pigments;
synthetic wood material (3): polystyrene (90-95%)+additives/pigments/colorless mineral filler.

The thickness of the protective intermediate layer was 0.08 mm and that of the lead was 3.2 mm.

This pencil was compared with a pencil obtained under the same conditions but with a sheath comprising: polystyrene (40-60%), EVA (40-60%)+pigments in a falling out lead test.

This test served to verify that the lead did not become detached from the wood material.

Test Equipment
TCM 201M CHATILLON AMETEK dynamometer or equivalent force meter

Sample Used in the Test:
50 pencils at t=0
minimum of 10 pencils after one cycle, 24 h at 0° C., 24 h at 40° C. for 21 days.

Test Method:
The set up was positioned vertically in a support and lowered at 50 millimeters per minute (ram/min) in order to come into contact with a metal plate.

Test Results:
The result was the measurement of the force necessary to push in the lead, expressed in daN.

None of the leads was considered to be falling out if the value was higher than 4 daN.

None of the test samples of the pencil of the present invention exhibited a falling out lead.

In contrast, the percentage of leads which fell out for the comparative pencils with an EVA-based sheath was approximately 30%, with half of them having a value of less than 4 daN and so considered to be falling out.

The pencil of the present invention, with a sheath comprising EBA instead of EVA, therefore exhibits better adhesion between the lead and the wood material; this avoids any possible problems with loss of cohesion during the pencil sharpening operation.

The invention claimed is:

1. A writing or coloring pencil comprising the following three layers obtained by co-extrusion:
   an unexpanded polymer-based lead;
   an unexpanded intermediate protective layer surrounding the lead and comprising an ethylene ($C_1$-$C_4$ alkyl) acrylate copolymer, alone or as a blend with a styrene polymer; and
   an expanded styrene polymer-based synthetic wood material surrounding the intermediate protective layer.

2. The writing or coloring pencil according to claim 1, wherein the ethylene ($C_1$-$C_4$ alkyl) acrylate copolymer is at least one copolymer selected from the group consisting of ethylene methyl acrylate copolymer, ethylene ethyl acrylate copolymer and ethylene butyl acrylate copolymer.

3. The writing or coloring pencil according to claim 2, wherein be ethylene ($C_1$-$C_4$ alkyl) acrylate copolymer is ethylene butyl acrylate copolymer.

4. The writing or coloring pencil according to claim 1, wherein the ethylene ($C_1$-$C_4$ alkyl) acrylate copolymer is in a sheath and has a content of the sheath that is in the range 20% to 100% by weight, with respect to a total weight of a composition of the sheath.

5. The writing or coloring pencil according to claim 4, wherein the ethylene ($C_1$-$C_4$ alkyl) acrylate copolymer content of the sheath is in the range 30% to 55% by weight, with respect to the total weight of the composition of the sheath.

6. The writing or coloring pencil according to claim 1, wherein the unexpanded polymer-based lead comprises a styrene polymer or a polyolefin.

7. The writing or coloring pencil according to claim 6, wherein the unexpanded polymer-based lead is acrylonitrile butadiene styrene or polypropylene.

8. The writing or coloring pencil according to claim 1, wherein the unexpanded intermediate protective layer has a thickness that is in the range 0.11 mm to 0.31 mm.

9. The writing or coloring pencil according to claim 8, wherein the ethylene ($C_1$-$C_4$ alkyl) acrylate copolymer is in a sheath and has a content of the sheath that is in the range 25% to 50% by weight, with respect to the total weight of a composition of the sheath.

10. The writing or coloring pencil according to claim 9, wherein the ethylene ($C_1$-$C_4$ alkyl) acrylate copolymer content of the sheath is in the range 30% to 40% by weight, with respect to the total weight of the composition of the sheath.

11. The writing or coloring pencil according to claim 8, wherein the thickness of the unexpanded protective intermediate layer is in the range 0.14 mm to 0.17 mm.

12. A writing or coloring pencil according to claim 1, wherein the unexpended intermediate protective layer has a thickness in the range 0.05 mm to 0.10 mm.

13. The writing or coloring pencil according to claim 12, wherein the thickness of the unexpanded protective intermediate layer is in the range 0.07 mm to 0.09 mm.

14. The writing or coloring pencil according to claim 12, wherein the ethylene ($C_1$-$C_4$ alkyl) acrylate copolymer is in a sheath and has a content of the sheath that is in the range 25% to 100% by weight, with respect to the total weight of a composition of the sheath.

15. The writing or coloring pencil according to claim 14, wherein the ethylene ($C_1$-$C_4$ alkyl) acrylate copolymer content of the sheath is in the range 45% to 55% by weight, with respect to the total weight of the composition of the sheath.

16. The writing or coloring pencil according to claim 1, wherein the unexpanded polymer-based lead has a diameter that is in the range 2 mm to 3.8 mm.

17. The writing or coloring pencil according to claim 1, wherein the unexpanded protective intermediate layer is of a color that is different from a color of the unexpanded polymer-based lead and from a color of the synthetic wood material or the unexpanded protective intermediate layer is of a color that is that is the same as that of the lead or as that of the synthetic wood material.

18. The writing or coloring pencil according to claim 1, wherein the styrene polymer of the synthetic wood material is polystyrene.

19. The writing or coloring pencil according to claim 1, which is a graphite pencil, wherein the unexpanded polymer-based lead comprises graphite.

20. The writing or coloring pencil according to claim 1, which is a colour pencil.

21. The writing or coloring pencil according to claim 1, further comprising: a supplemental decorative layer.

* * * * *